(12) United States Patent
Gilstrap

(10) Patent No.: US 11,183,824 B2
(45) Date of Patent: *Nov. 23, 2021

(54) ELECTRICAL BOX MOUNTING STRUCTURE PREVENTIVE OF WATER INGRESS

(71) Applicant: Mark Gilstrap, Monroe, WA (US)

(72) Inventor: Mark Gilstrap, Monroe, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,491

(22) Filed: Oct. 18, 2019

(65) Prior Publication Data

US 2020/0052473 A1 Feb. 13, 2020

Related U.S. Application Data

(63) Continuation-in-part of application No. 16/179,210, filed on Nov. 2, 2018, now Pat. No. 10,454,257,
(Continued)

(51) Int. Cl.
*H02G 3/08* (2006.01)
*E04B 2/70* (2006.01)
*H02G 3/12* (2006.01)
*E04B 1/62* (2006.01)
*F21V 31/00* (2006.01)
*H01R 13/73* (2006.01)
(Continued)

(52) U.S. Cl.
CPC ............. *H02G 3/088* (2013.01); *E04B 1/625* (2013.01); *E04B 2/70* (2013.01); *F21V 27/02* (2013.01); *F21V 31/005* (2013.01); *H01R 13/73* (2013.01); *H02G 3/083* (2013.01); *H02G 3/10* (2013.01); *H02G 3/121* (2013.01); *E04B 2002/7488* (2013.01); *F21W 2131/107* (2013.01)

(58) Field of Classification Search
CPC ........ H02G 3/088; H02G 3/121; H02G 3/083; H02G 3/10; E04B 2/70; E04B 1/625; E04B 2002/7488; F21W 2131/107; F21V 21/03; F21V 31/005; F21V 27/02; H01R 25/006; H01R 13/73
USPC ......... 174/481, 53, 58, 54, 56; 52/220.8, 58, 52/62; 220/4.02; 439/538
See application file for complete search history.

(56) References Cited

U.S. PATENT DOCUMENTS 2,378,861 A 6/1945 Peevey
2,989,206 A * 6/1961 Mcafee .................. H02G 3/126
220/3.7

(Continued)

OTHER PUBLICATIONS

International Search Report and Written Opinion issued by the Australia Patent Office dated May 9, 2019 for related International application PCT/US2019/017701.

*Primary Examiner* — Brent W Herring
(74) *Attorney, Agent, or Firm* — Timothy E. Siegel Patent Law, PLLC; Timothy E. Siegel

(57) ABSTRACT

An electrical unit mounting assembly, having a top, bottom, back and front, and including a partial enclosure, made of insulating material, defining a cavity having a mouth at its front and defining a through-hole leading to the cavity, at its back. A panel extending outwardly from the mouth, for at least 4 cm and having a front surface. Further, when the assembly is oriented in an upright manner so that its top is topmost, the through-hole is constructed so that liquid cannot be driven by gravity from inside the cavity, through the through-hole.

19 Claims, 12 Drawing Sheets

Related U.S. Application Data which is a continuation of application No. 15/900,113, filed on Feb. 20, 2018, now Pat. No. 10,177,509, which is a continuation of application No. 15/900,152, filed on Feb. 20, 2018, now Pat. No. 10,128,644.

(60) Provisional application No. 62/630,379, filed on Feb. 14, 2018.

(51) Int. Cl.
  *H02G 3/10* (2006.01)
  *F21V 27/02* (2006.01)
  *F21W 131/107* (2006.01)
  *E04B 2/74* (2006.01)

(56) References Cited

U.S. PATENT DOCUMENTS

| | | | |
|---|---|---|---|
| 4,134,636 A | | 1/1979 | Kleinatland |
| 4,436,952 A | | 3/1984 | Lockwood |
| 4,634,015 A | * | 1/1987 | Taylor .................... H02G 3/121 220/3.7 |
| 5,042,673 A | | 8/1991 | McShane |
| 5,287,665 A | | 2/1994 | Rath |
| 5,596,174 A | * | 1/1997 | Sapienza ................ H02G 3/086 174/53 |
| 5,959,249 A | | 9/1999 | Hotta |
| 6,166,327 A | | 12/2000 | Saito et al. |
| 6,506,061 B2 | | 1/2003 | Yuasa et al. |
| 6,547,589 B2 | | 4/2003 | Magyar |
| 6,596,938 B2 | | 7/2003 | Gilleran |
| 6,629,619 B2 | | 10/2003 | Sato |
| 6,737,576 B1 | | 5/2004 | Dinh |
| 6,866,032 B2 | | 3/2005 | Magyar |
| 6,881,094 B2 | | 4/2005 | Magyar |
| 6,908,003 B2 | | 6/2005 | Feyes |
| 6,951,081 B2 | | 10/2005 | Bonshor |
| 6,982,379 B2 | | 1/2006 | Saka et al. |
| 7,312,395 B1 | * | 12/2007 | Gretz .................... H02G 3/123 174/53 |
| 7,490,441 B2 | | 2/2009 | Burton |
| 7,531,743 B2 | * | 5/2009 | Johnson ................ H02G 3/081 174/53 |
| 7,557,308 B2 | * | 7/2009 | Dinh ...................... H02G 3/123 174/480 |
| 7,645,937 B2 | | 1/2010 | Bhosale |
| 7,812,253 B2 | | 10/2010 | Moselle |
| 8,013,242 B1 | | 9/2011 | Thibault |
| 8,253,017 B1 | * | 8/2012 | Cleghorn .............. H02G 3/086 174/50 |
| 8,558,110 B1 | * | 10/2013 | Shotey .................. H02G 3/086 174/53 |
| 8,633,384 B1 | | 1/2014 | Shotey |
| 8,816,198 B1 | * | 8/2014 | Cleghorn .............. H02G 3/086 174/50 |
| 8,893,910 B2 | * | 11/2014 | Batchelor ............. H02G 3/088 220/242 |
| 9,048,645 B1 | | 6/2015 | Gretz |
| 9,226,418 B2 | * | 12/2015 | Magno, Jr. ........... H05K 5/0221 |
| 9,231,389 B2 | * | 1/2016 | Batchelor ............. H02G 3/123 |
| 9,893,503 B2 | | 2/2018 | Geno |
| 9,954,348 B2 | | 4/2018 | Rose |
| 9,960,583 B2 | * | 5/2018 | Batchelor ............. H02G 3/123 |
| 10,079,481 B2 | * | 9/2018 | Thomas ................ H02G 3/088 |
| 10,128,644 B1 | | 11/2018 | Gilstrap |
| 10,177,509 B1 | | 1/2019 | Gilstrap |
| 10,454,257 B2 | | 10/2019 | Gilstrap |
| 2002/0031942 A1 | | 3/2002 | Magyar |
| 2003/0165364 A1 | | 9/2003 | Magyar |
| 2003/0190838 A1 | | 10/2003 | Magyar |
| 2004/0182857 A1 | | 9/2004 | Feyes |
| 2005/0051546 A1 | * | 3/2005 | Dinh ...................... H02G 3/126 220/3.7 |
| 2007/0175649 A1 | | 8/2007 | Moselle |
| 2008/0178557 A1 | | 7/2008 | Parsons |
| 2011/0253565 A1 | | 10/2011 | Moselle |
| 2012/0186871 A1 | | 7/2012 | Roberts |
| 2012/0325808 A1 | * | 12/2012 | Batchelor ............ H01R 13/4532 220/3.8 |
| 2013/0264088 A1 | | 10/2013 | Dinh |
| 2014/0083734 A1 | * | 3/2014 | Magno, Jr. ............. H02G 3/088 174/50 |
| 2015/0047276 A1 | * | 2/2015 | Gandolfo .................. H02G 3/22 52/220.8 |
| 2015/0129298 A1 | * | 5/2015 | Batchelor ............ H01R 13/447 174/535 |
| 2016/0141852 A1 | | 5/2016 | Gagne |
| 2016/0226232 A1 | | 8/2016 | Gagne |
| 2017/0047717 A1 | * | 2/2017 | Thomas ................ H02G 3/088 |
| 2017/0271858 A1 | | 9/2017 | Rose |
| 2018/0209205 A1 | | 7/2018 | Gilleran |
| 2019/0252868 A1 | * | 8/2019 | Gilstrap ................ H02G 3/121 |

\* cited by examiner

ELECTRICAL BOX MOUNTING STRUCTURE PREVENTIVE OF WATER INGRESS

RELATED APPLICATIONS

This application is a continuation-in-part of application U.S. Ser. No. 16/179,210, filed Nov. 2, 2018, which itself is a continuation of application U.S. Ser. No. 15/900,113, filed Feb. 20, 2018, now U.S. Pat. No. 10,177,509, issued Jan. 8, 2019, and application U.S. Ser. No. 15/900,152, filed Feb. 20, 2018, now U.S. Pat. No. 10,128,644, issued Nov. 13, 2018, and both of which claim benefit of provisional patent application U.S. Ser. No. 62/630,379 filed on Feb. 14, 2018, all of which are incorporated by referenced as if fully set forth herein.

BACKGROUND

A modern building structure is constructed with an exterior cladding, or primary weather barrier, that provides a first line of defense against the elements and, also, provides a good appearance for the building structure. Interior to and generally supporting the exterior cladding there is a building frame, typically made of dimensioned lumber (longitudinal elements) mechanically attached together, with sheets of plywood or particle board mechanically attached to the exterior side of these longitudinal elements. The dimensioned lumber may go by industry standard terminology of 2 by 4s, 2 by 6s, 2 by 8s, or even wider elements, depending on the load that must be born, and other factors. Wall board is typically mechanically fastened to the interior side of the longitudinal elements, thereby defining a "wall cavity" between the exterior sheathing and the interior wall board. A secondary weather barrier, that is generally water resistant and is typically made of polymer sheeting, such as Tyvek®, or building paper, is mechanically attached to the building frame. These sheets are generally arranged as shingles are, with each upper piece of sheeting overlapping on the outside of the sheeting immediately below. With this arrangement water does not have any chance of penetrating through to the wall cavity of the building as it flows downward.

A weakness in this scheme is created by electrical receptacles and light fixtures, for example for an exterior electrical junction box, which must go through the exterior cladding and the secondary weather barrier. The general scheme for these (until recently) has been to caulk around them to create a seal against the exterior cladding. This is ineffective, however, as cycles of thermal expansion over the years, and the assault of the elements can weaken the seal, leading to water penetrating into the wall cavity. More recently, a line of products, have been introduced, with a shell defining a cavity and a brim, stretching out from a position to the rear of the front of the shell. These are installed, over the electrical junction boxes, with tape or mechanical attachment. Unfortunately, the portion of the shell extending out from the brim location may not protrude out far enough (or may protrude too far) from the brim to be flush with the edge of the exterior cladding, which differs in thickness from job to job. An installation flush with the exterior surface is desirable for appearance and ease of use of an outlet. Also, water that enters the cavity may work its way between the shell extension and the electrical junction box or to the rear of the electrical junction box and exit through the holes in the electrical junction box that accommodate the electrical wires to the electrical receptacle, thereby entering the wall cavity and potentially causing water damage. Also, it is possible that in places the inner surface of the exterior cladding will rest against the secondary weather barrier and the brim. In this case, water may become trapped and instead of flowing downward sit and cause decay and potential mold growth on the interior of the exterior cladding. Finally, the electrical junction box typically requires a further bracket, or fasteners, for secure attachment to the building frame.

SUMMARY

The following embodiments and aspects thereof are described and illustrated in conjunction with systems, tools and methods which are meant to be exemplary and illustrative, not limiting in scope. In various embodiments, one or more of the embodiments are directed to other improvements.

In a first separate aspect, the present invention may take the form of an electrical unit mounting assembly, having a top, bottom, back and front, and including a partial enclosure, made of insulating material, defining a cavity having a mouth at its front and defining a through-hole leading to the cavity, at its back. A panel extending outwardly from the mouth, for at least 4 cm and having a front surface. Further, when the assembly is oriented in an upright manner so that its top is topmost, the through-hole is constructed so that liquid cannot be driven by gravity from inside the cavity, through the through-hole.

In a second separate aspect, the present invention may take the form of an electrical receptacle mounting apparatus, having a base portion, made of insulating material and that includes a partial enclosure, defining a cavity having a mouth and a through-hole, opposed to the mouth and being positioned and shaped to prevent water flowing through the through-hole out of the cavity. Further, a panel extends outwardly for more than 4 cm, about the mouth; a telescoping tubular extension, made of insulating material, is fitted into the cavity, so that cavity and extension together are sized to fit a one, two or three electrical outlet receptacles. Also, a bolt has a longitudinal segment that is rotatably engaged to a first one of the base portion and the extension, and also has a threaded portion that is in threaded engagement to a second one of the base portion and the extension, so that rotation of the threaded portion causes the extension to move in a telescoping manner relative to the cavity.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in the referenced drawings. It is intended that the embodiments and FIGS. disclosed herein are considered illustrative rather than restrictive.

DETAILED DESCRIPTION OF THE PREFERRED EMBODIMENTS

Definition

As used in this application, an "electrical unit" may be either an electrical receptacle (typically having 2, 4, 6 or 8 individual sockets), or an electrical fixture, for example a lighting fixture.

Description

Figure 1:
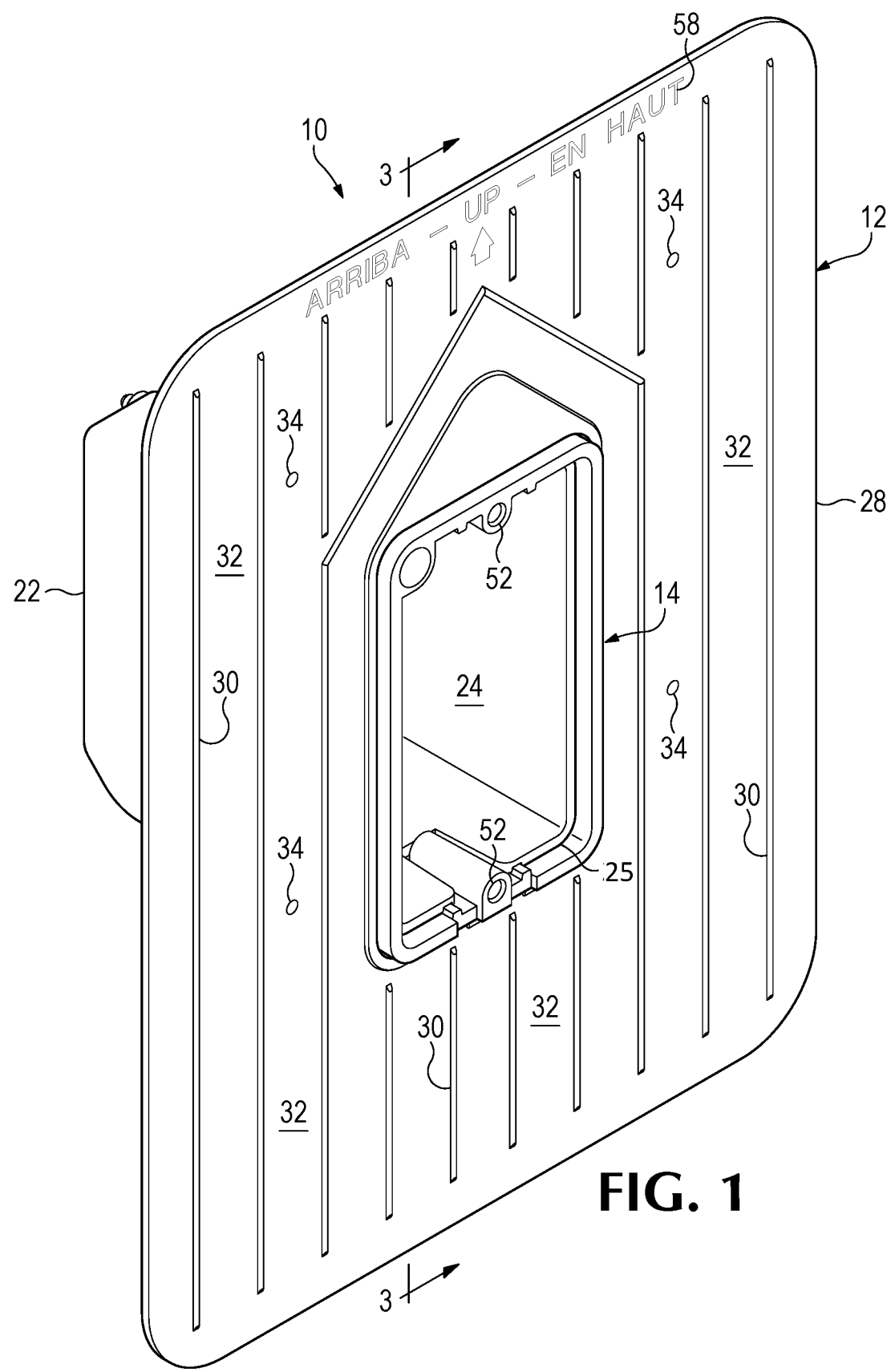
FIG. 1 is an isometric top-front view of an embodiment of an electrical receptacle mounting assembly, according to the present invention.
Figure 2:
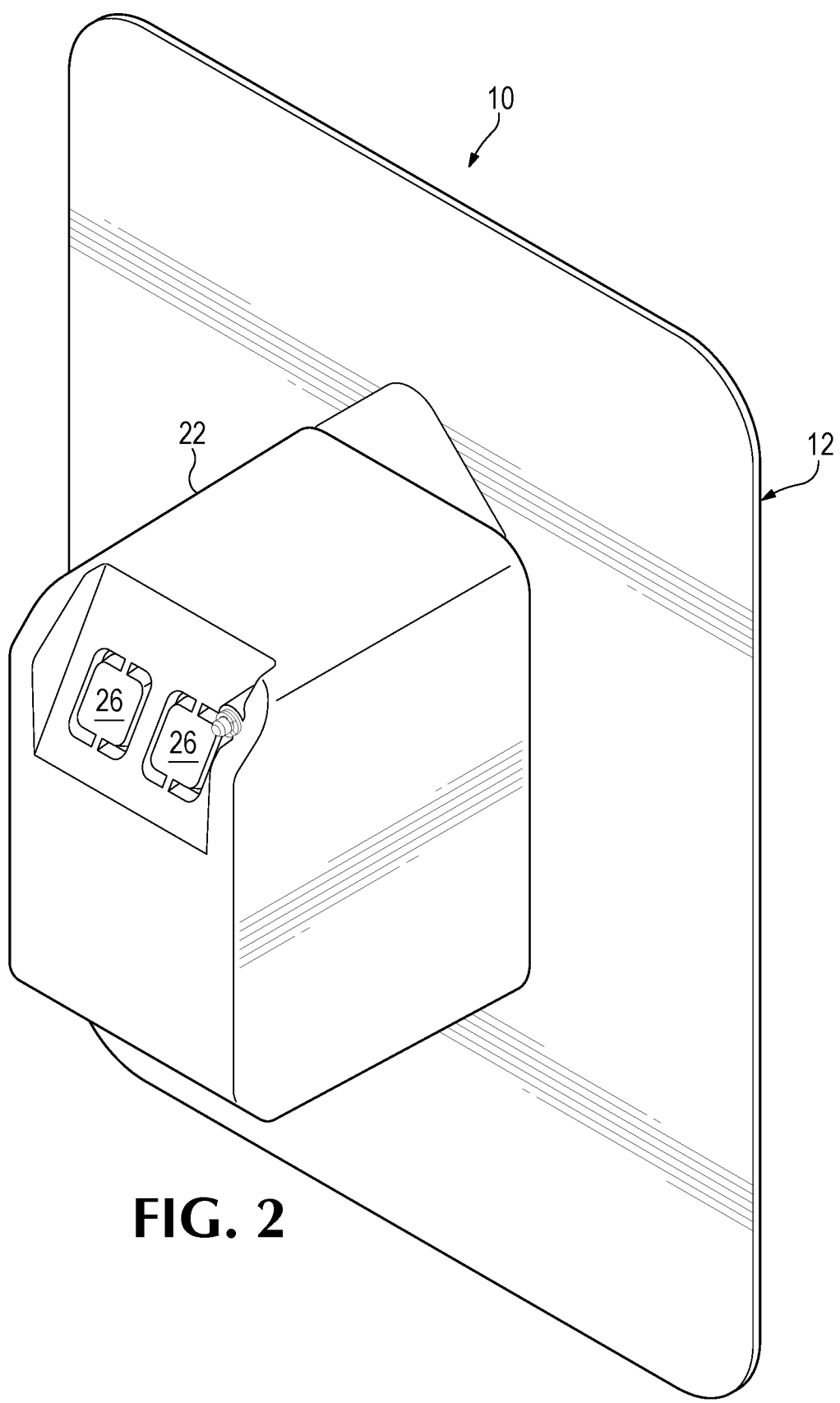
FIG. 2 is an isometric top-rear view of the electrical receptacle mounting assembly of FIG. 1.
Figure 3:
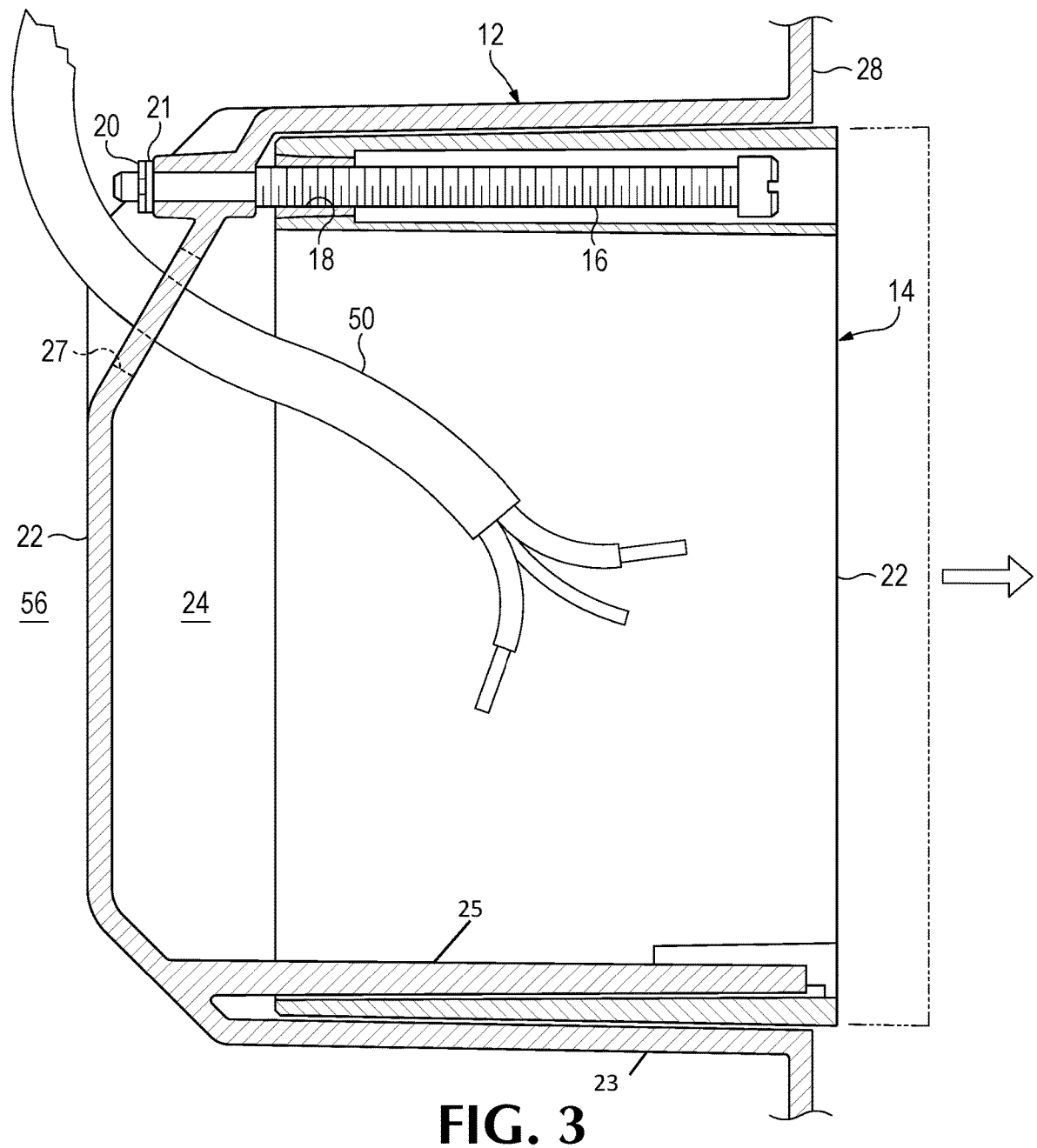
FIG. 3 is an enlarged sectional view of a portion of the electrical receptacle mounting assembly of FIG. 1 along view line 3-3 of FIG. 1 with an alternate position of the front face of telescoping extension 14 shown in dashed line.
Figure 4:
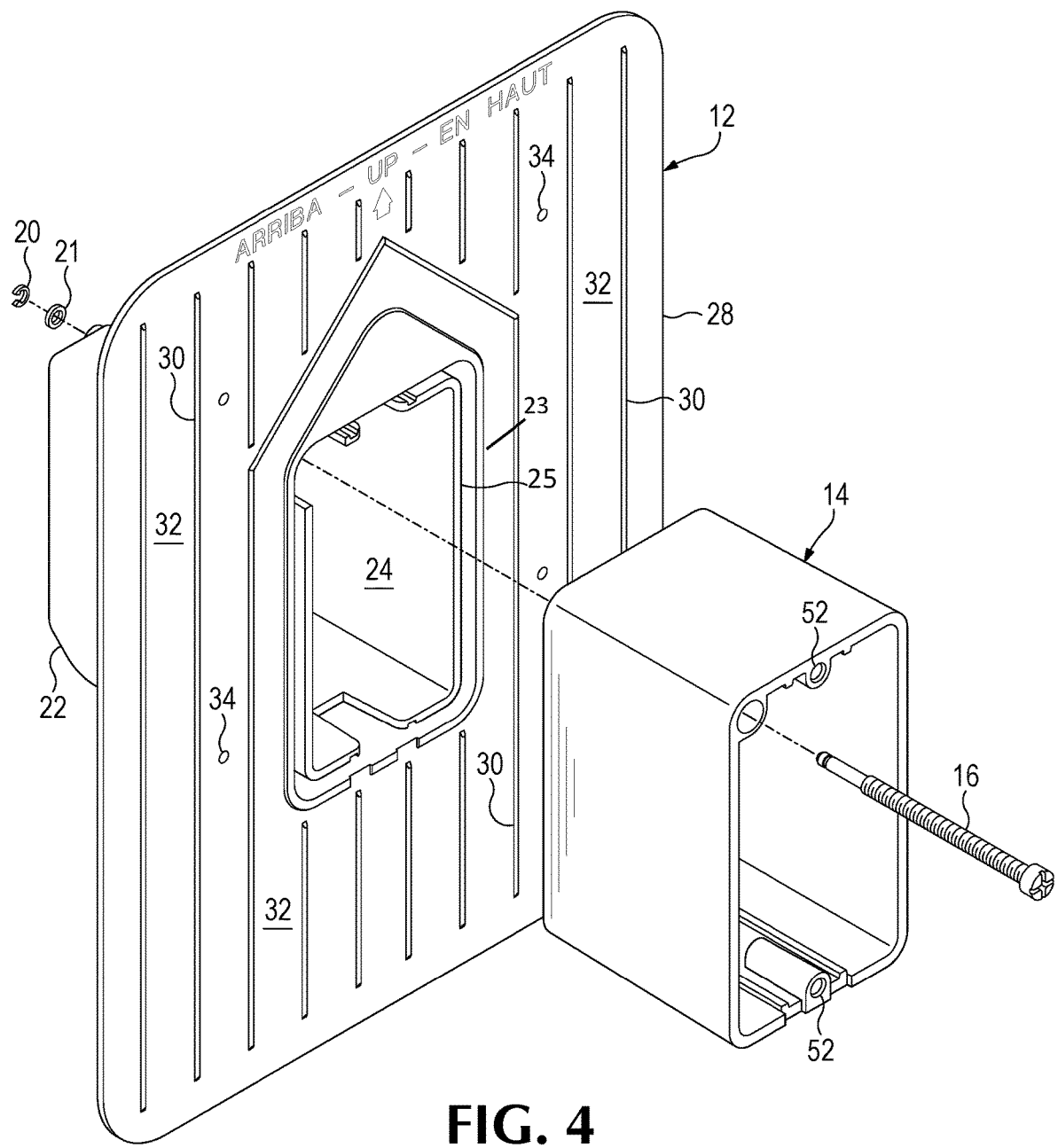
FIG. 4 is an exploded isometric view of the electrical receptacle mounting assembly of FIG. 1.

Referring to FIGS. 1-4, in the attached set of FIGS., an electrical receptacle mounting assembly 10 includes a base unit 12 and a telescoping extension 14. FIGS. 3 and 4 show an adjustment bolt 16 that includes a threaded portion that extends through a threaded opening 18 and is rotatably attached at an anchor 20, in the form of a c-clip, over a washer 21 at the rear of base unit 12, so that an installer may adjust the distance that extension 14 extends out of base unit by rotating bolt 16, with a manual or an electric screw driver. Skilled persons will recognize that this design can be rearranged so that bolt 16 is in threaded engagement to base unit 12, and rotatably engaged (but fixed in terms of position along the length of bolt 16) to telescoping extension 14, to achieve the same effect.

Base unit 12 consists of two general portions: partial enclosure 22 and panel 28. Partial enclosure 22 defines a base unit cavity 24 that accepts extension 14. Although enclosure 22 has two punch-outs 26 (see FIG. 2) that may be removed to create through-holes 27 (FIG. 3) for permitting an electrician to extend wires into cavity 24 and extension 14, punch-outs 26 are at the top of enclosure 22.

Unlike otherwise similar assemblies, there are no through-holes at the bottom. Accordingly, any water that enters cavity 24 must exit through the front.

Panel 28 has a set of protruding ribs 30, that prevent any portion of the primary weather barrier 54 (FIG. 8) from blocking water flow through a set of channels 32, defined by ribs 30. A set of guide dimples 34 provide spaced apart places for nailing or screwing base unit 12 to the framing of the structure.

Figure 5:
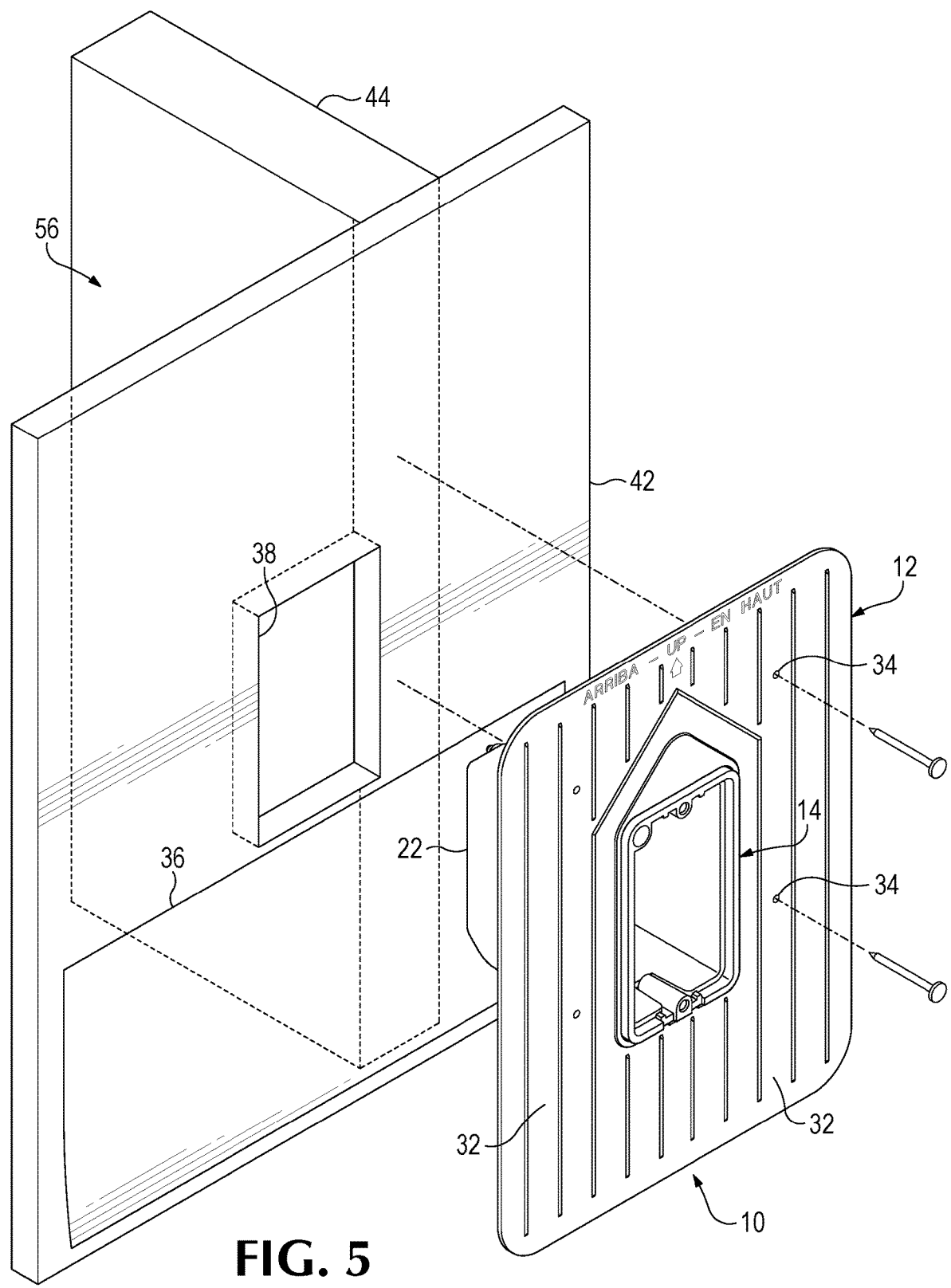
FIG. 5 is an exploded isometric view of the electrical receptacle mounting assembly of FIG. 1, shown during a step in the installation of the assembly into a wall frame, with obscured portions of a longitudinal support in dashed lines.
Figure 6:
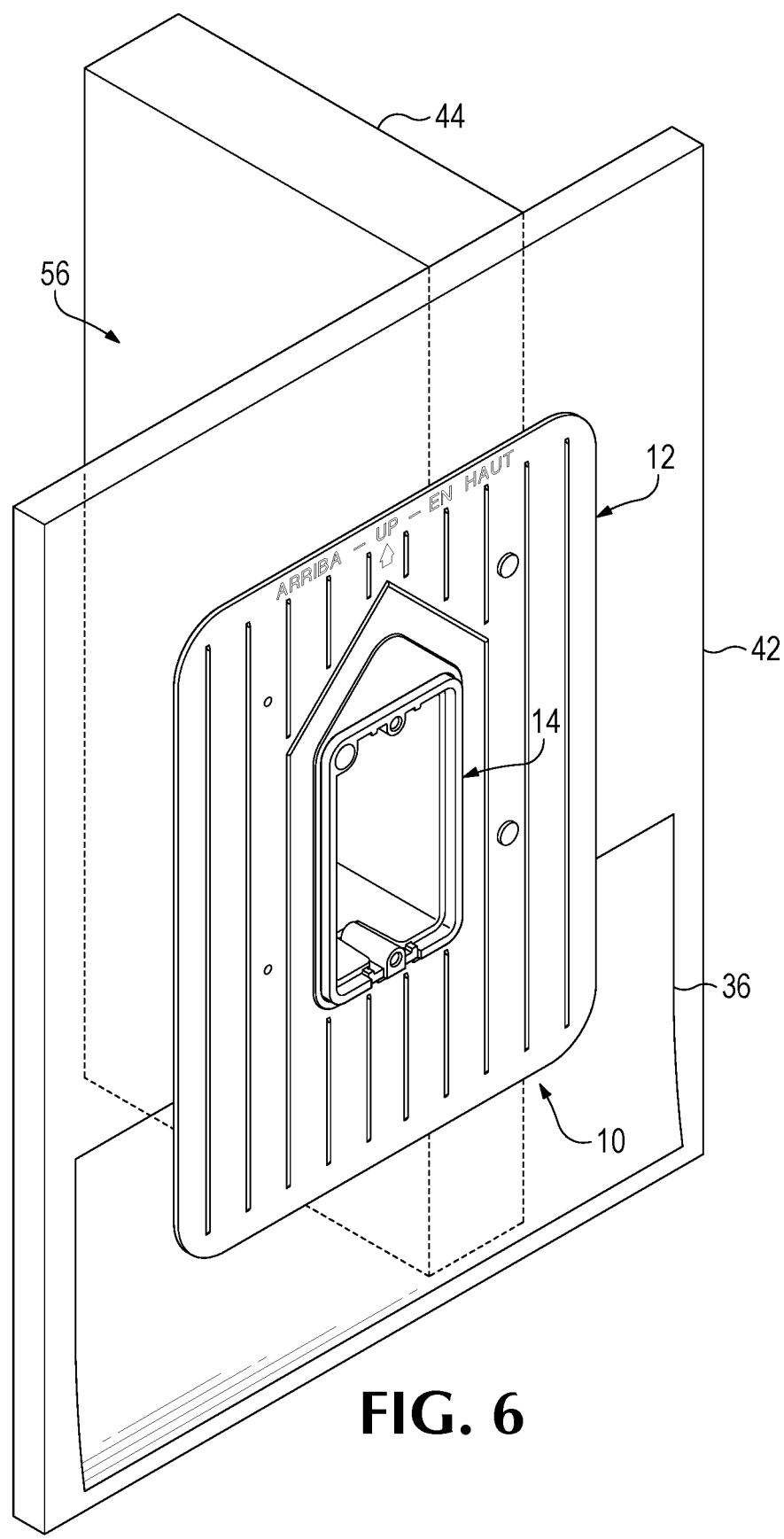
FIG. 6 is an isometric view of the electrical receptacle mounting assembly of FIG. 1, shown during a step in the installation of the assembly into a wall frame, with obscured portions of a framing longitudinal support in dashed lines.
Figure 7:
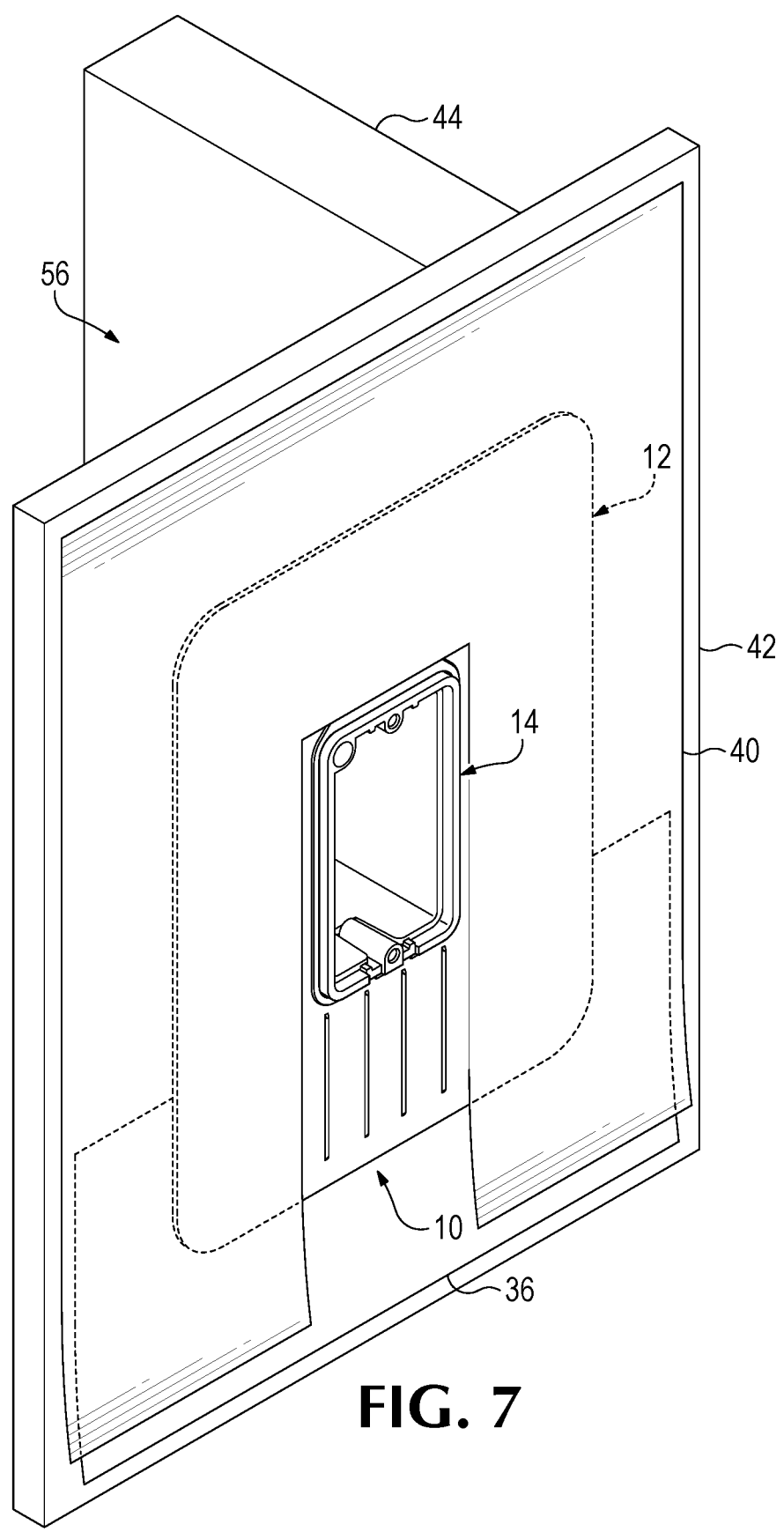
FIG. 7 is an isometric view of the electrical receptacle mounting assembly of FIG. 1, during a step in the installation of the assembly into a wall frame, with a secondary weather barrier, and with obscured portions of the assembly and a portion of a lower sheet of weather barrier shown in dashed line.

Referring to FIGS. 5 and 6, to use electrical receptacle mounting assembly 10, a sheet 36 ("bib sheet"), of the material used for the secondary weather barrier is installed in a location directly beneath a desired location for an electrical receptacle, and a through-hole 38 is created through an underlying piece of sheathing 42, to accommodate enclosure 22. Enclosure 22 is fitted through through-hole 38 and unit 12 is nailed or screwed to a framing longitudinal support 44 at dimples 34, so that the lower portion of panel 28 extends over bib sheet 36. Then (FIG. 7), an additional sheet 40 of the secondary weather barrier is added, so that it overlaps the top part of the front of panel 28 and of sheet 36. As shown, a hole or a notch is cut out to accommodate an eventual protrusion of telescoping extension 14. Secondary weather barrier elements 40 and 36 are water resistant, typically made of polymer sheeting such as Tyvek®, comprising high-density polyethylene fibers. Alternatively. polypropylene sheeting or asphalt saturated building paper is used.

At this point, or earlier, prior to wallboard being attached to the interior side of support 44 a pair of wires 50 (FIG. 3) are pulled through holes 27 (FIG. 3), and (referring to FIG. 8) an electrical receptacle 60, typically an outlet, is installed into cavity 24, connected to wires 50, and retained with mechanical screws, installed in a pair of (threaded or unthreaded) through-holes 52. Finally, the primary weather barrier 54 is installed and bolt 16 is rotated to bring extension 14 to the level of the outside surface of barrier 54.

The unit 10 is now installed, together with unit 60, and the wall cavity 56 is entirely protected from water ingress.

Figure 8:
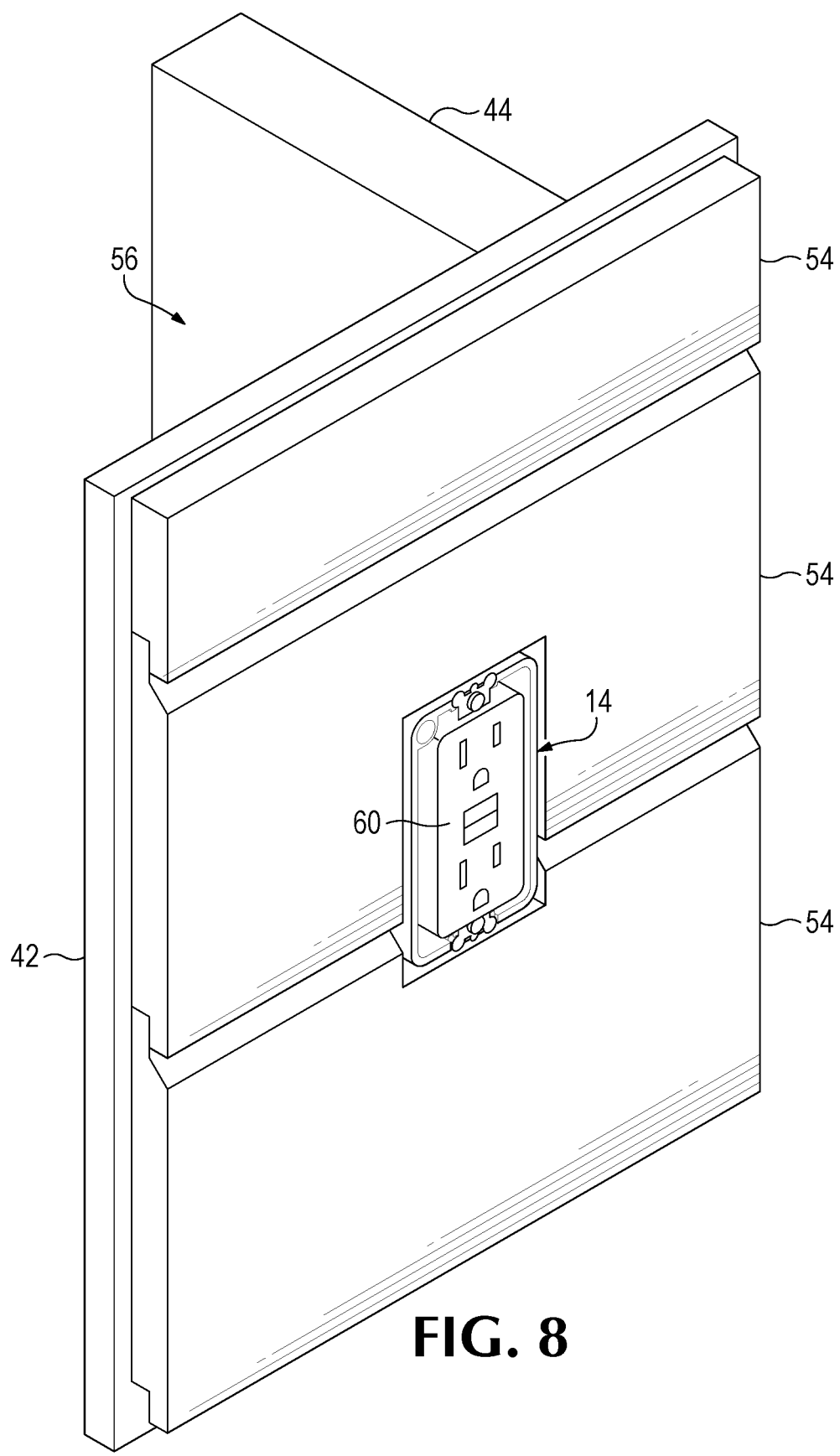
FIG. 8 is an isometric view of the electrical receptacle mounting assembly of FIG. 1, installed into a finished wall and hosting an electrical receptacle.

Referring to FIG. 8, an exterior wall having an outer surface has now been created, that includes a frame, made of longitudinal structural elements 44, joined together and a secondary weather barrier made of sheets 40 and 36. Sheets 40 and 36 and others are not shown, but are mounted on the sheathing 42 which are themselves supported by the frame 44. A primary weather barrier 54, also known as cladding, is outward of the secondary weather barrier, and has an outer surface that is also the outer surface of the exterior wall. Electrical receptacle mounting assembly 10 includes a base 12. The base has two portions: enclosure 22 and panel 28. Enclosure 22 defines a cavity 24 having a mouth, a through-hole 27, opposed to the mouth, leading to the cavity 24. Panel 28 extends outwardly from the mouth, in the space 62 between underlying sheathing 42 and primary weather barrier 54, parallel to the secondary weather barrier 40. The panel is joined to at least one of the longitudinal structural elements 44 and is joined to the secondary weather barrier 40, so that base unit 12 forms an additional secondary weather barrier. Electrical mounting unit assembly 10 further includes telescoping extension 14 having a front surface, and wherein extension 14 is an extension set in place so that the front surface is flush with the outer surface of the primary weather barrier 54. Electrical unit 60 is set into the base unit cavity 24 and insulated electrical wires 50 pass through through-holes 27 of enclosure 22. Thus, electrical unit 60 is electrically connected and may now be powered.

Through-holes 27, created after the removal of punch-outs 26, prevent water flow out of enclosure cavity 24 into wall cavity 56, where it could potentially do a great deal of harm. In an alternative preferred embodiment, additional through-holes are provided, beneath through-holes 27, but also having a downward angle (if viewed from the outside of cavity 24 to the inside), similar to the disposition of through-holes 27. Assembly 10 may be generally formed of a polymeric material, such as polyvinyl chloride, polyamide or a similar material, and telescoping extension 14 may be injection molded. Because assembly 10 is not vertically symmetric, as it is designed to prevent water from flowing out the back of enclosure 22 into a wall cavity, it is important that it bear indicia 58, indicating the "up" side, as shown.

In alternative embodiments, instead of ribs 30, other forms of raised areas are used to define down channels 32, for example a sequence of raised dots or oval shapes. In another embodiment, down channels 32 are not linear, as shown, but are wavy or split apart and joined together. Any method of preventing the interior surface (not shown) of the cladding 54 from blocking the downflow of water by resting against a portion of the surface of panel 28 falls within the scope of one separate aspect of the invention.

Also, in an alternative embodiment, telescoping extension 14 is omitted, and may be replaced with an extension of enclosure 22, extending forward of panel 28. In a preferred embodiment a set of mounting assemblies, similar to mounting assembly 10, but without telescoping extension 14 are provided, with extensions of enclosure 22, projecting forward by differing lengths from panel 28. An installer chooses the assembly having an extension that comes closest to matching the prospective location of the outside surface of the primary weather barrier. It should further be noted that in all of the embodiments 10, 10' and 110, telescoping extension is held between a pair of walls, defined by base unit 12, as seen in FIG. 4 and in sectional view, at the bottom of FIG. 3. This provides stability for the telescoping extension 14.

Figure 9:
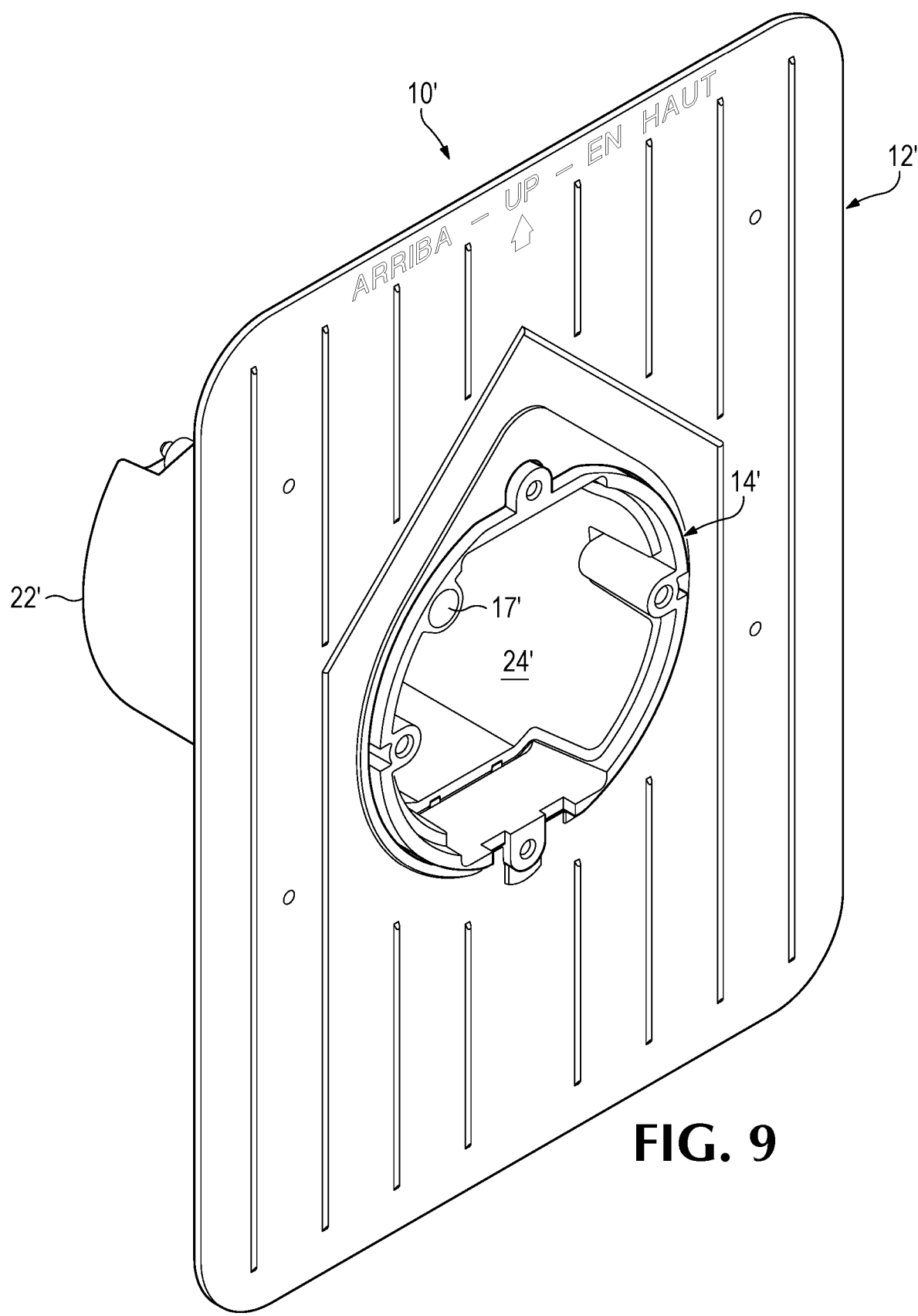
FIG. 9 is an isometric top-front view of the front of an embodiment of an electrical light fixture mounting assembly, according to the present invention.
Figure 10:
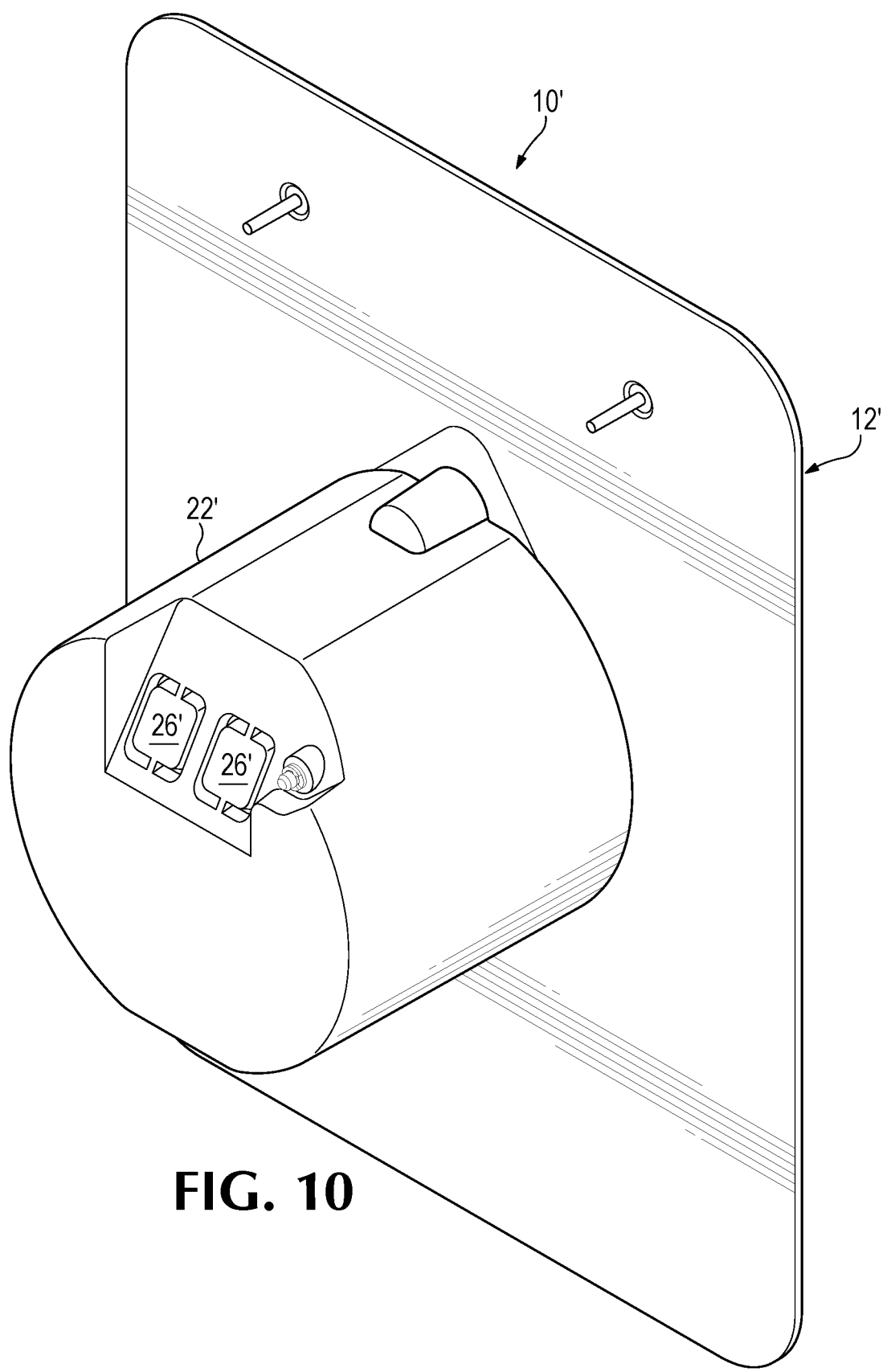
FIG. 10 is an isometric top-rear view of the face of the electrical light fixture mounting assembly of FIG. 9.
Figure 13:
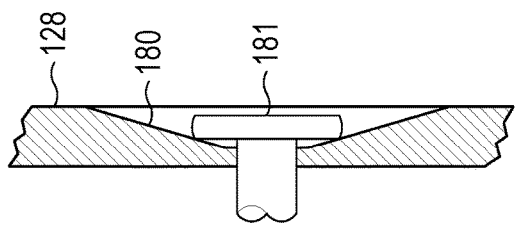
FIG. 13 is a detail view of the fixture of FIG. 11, along line 13-13, and showing an additional element, that is a nail.

FIGS. 9 and 10 show an embodiment of an electrical light fixture mounting assembly 10', having a base unit 12' and an enclosure 22' hosting a telescoping tubular extension 14'. As noted in the definition section, an "electrical unit" may be either a receptacle or a fixture. Assembly 10' is of a general form most typically used for the junction of a light fixture with a source of electricity. Although assembly 10' is most typically used for mounting an electrical light, it is not limited to this role, but could be used to mount some type of electrical fixture, as well. A pair punch-outs 26' permit the creation of through-holes (not shown) similar to through-holes 27 in assembly 10.

A bolt (not shown), similar to bolt 16 of assembly 10 held inside bolt cavity 17' and engaged to base unit 12' in the same manner as bolt 16 permits speedy adjustment of the level of projection of extension 14' from assembly 10'. Tubular extension 14' and enclosure 22' are shaped in more of a piecewise oval manner, to accommodate a matching electrical receptacle or light fixture (not shown).

Figure 12:
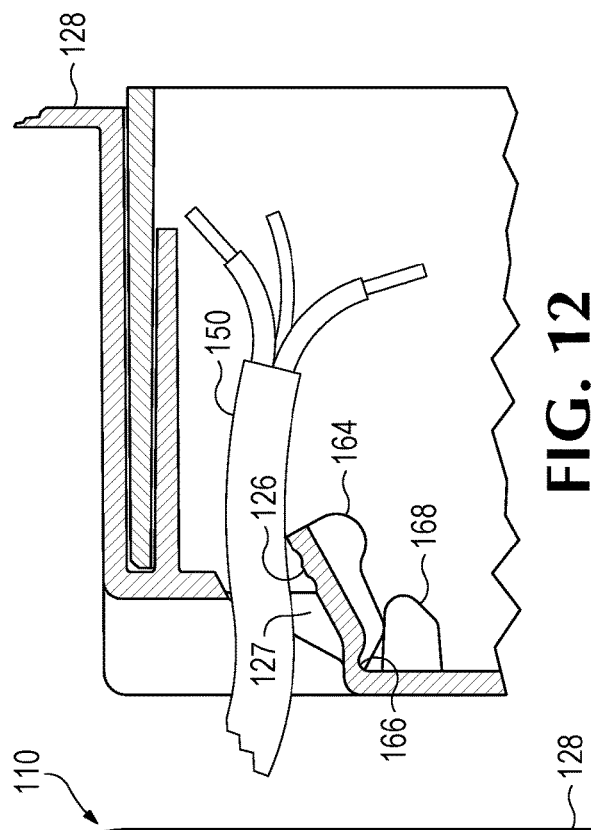
FIG. 12 is a detail view of the fixture of FIG. 11, along line 12-12, and showing an additional element, that is a wire.
Figure 11:
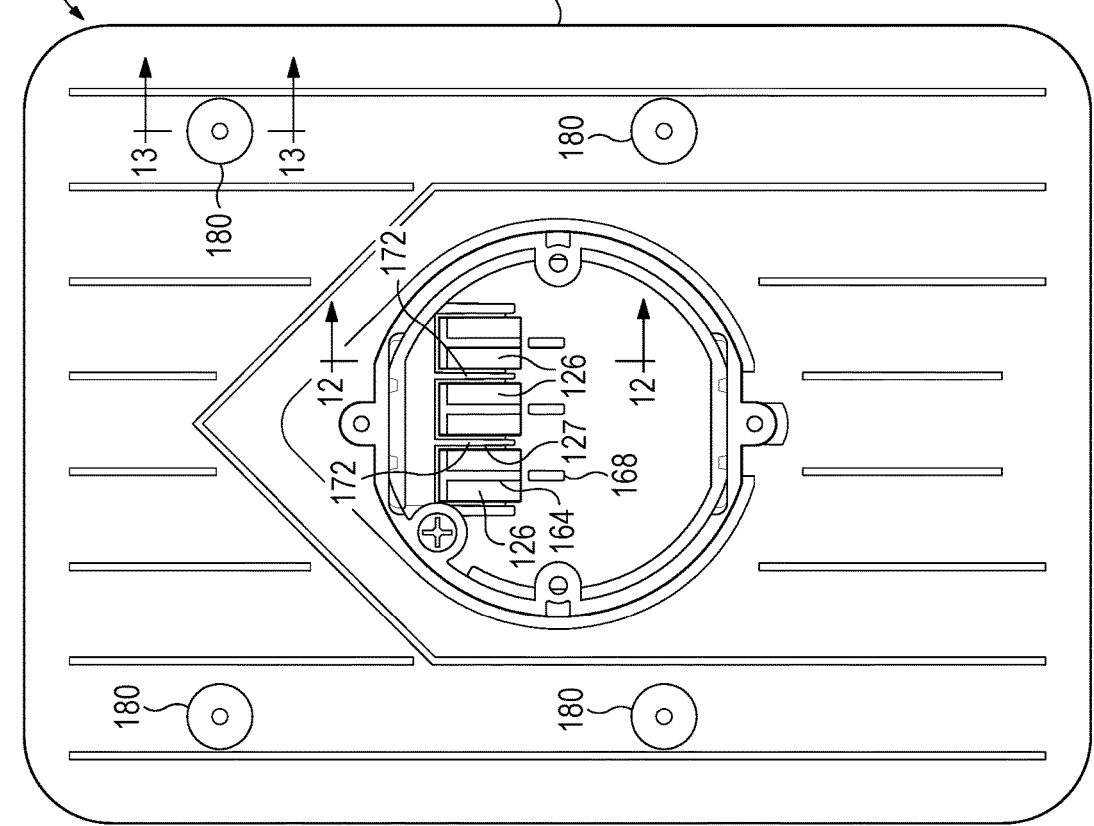
FIG. 11 is a front view of an alternative embodiment of an electrical light fixture mounting assembly, according to the present invention.
Figure 14:
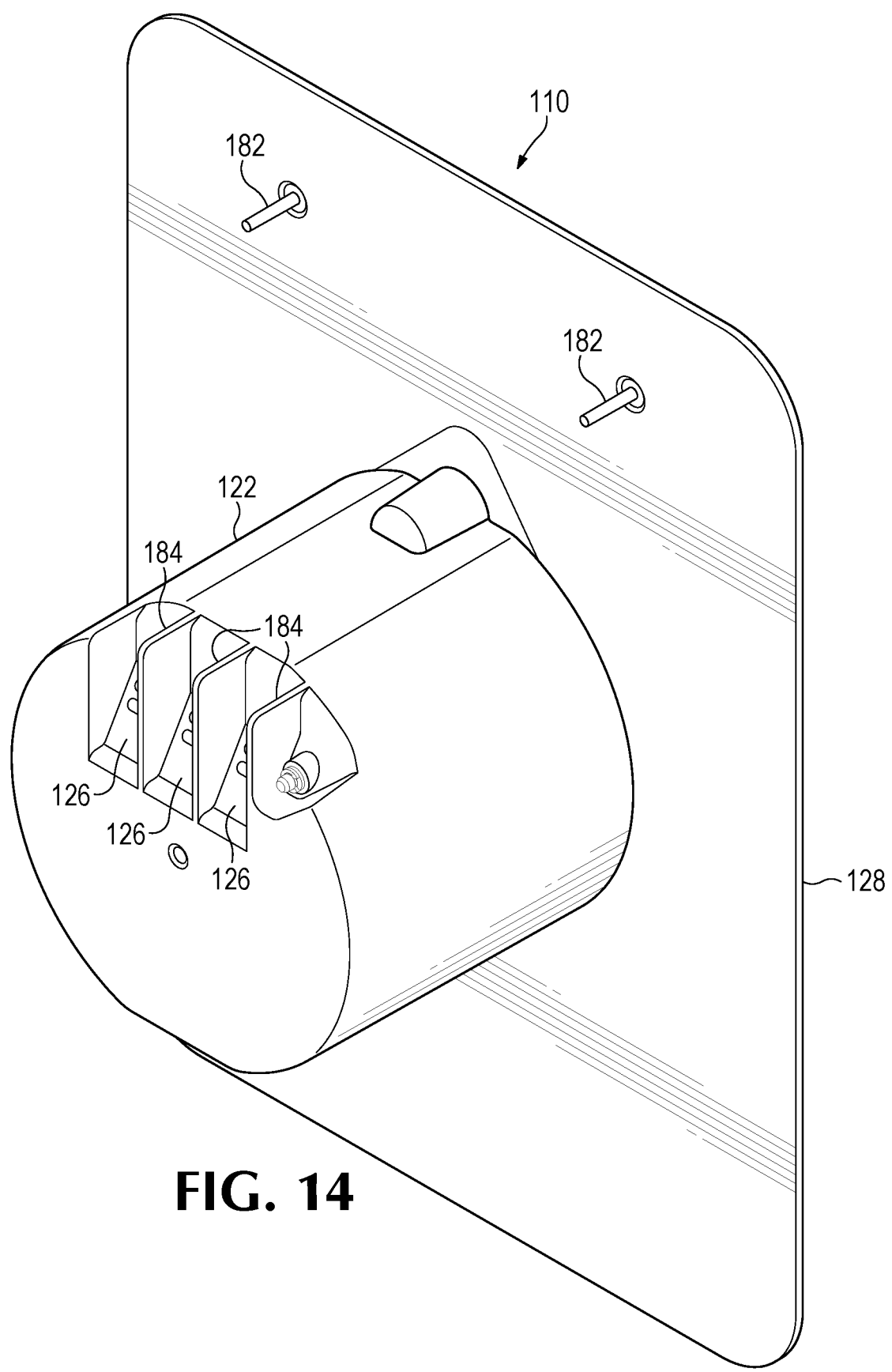
FIG. 14 is a rear view of the embodiment of FIG. 11.

FIGS. 11 through 14 show an alternative embodiment of an electrical light fixture mounting assembly 110. This embodiment is similar to assembly 10', but instead of having punch-outs 26', a set of through-holes 127 are each kept in a shut state by a hinged closure 126 that is urged to a closed state, until needed. To utilize assembly 110 a technician can pull open a closure 126, using a needle nose pliers to grasp a handle 164 and pull forward. Referring, specifically, to FIG. 12, a wire 150 is then pulled through through-hole 127 and clamped in place by closure 126, which is urged to the shut position by internal forces at its hinge 166 and by resistance from closure stop 168, if closure 126 is opened far enough. Further, a set of wire separating barriers 172 are provided. Finally, referring specifically to FIGS. 11 and 13, a front panel 128 defines a set of depressions 180, each to accommodate to the head of a nail 181, or a screw (not shown). Referring to FIG. 14, a set of separators 184 keep wires extending through through-holes 127 cleanly separated.

It may be noted that FIGS. 5-8 show an installation in which sheathing is attached over the studs 56, but in many framing jobs, referred to as "open stud framing" this is not done, and the outer wall is supported directly on the studs. Referring now to FIGS. 10 and 14, an additional feature for particular use in open stud framing constitutes a pair of alignment posts 182, which are aligned to the furthest sideways extent of the exterior of enclosure 22' or 122. The assembly 10' or 110 may be placed so that one of the posts 182, and the side of the exterior of enclosure 22' or 122 both abut a stud on one side. This assures that the assembly 10' or 110 is as plumb as the stud and cleanly abuts the stud. But if sheathing (such as sheathing 42 in FIG. 5) is used, then posts 182 would prevent panel 12' or 128 from abutting the sheathing 42—and they are broken off, which may be easily done as they are thin and made of the same polymeric material, as the rest of assembly 110, which is the same material noted for assembly 10, above.

The method, device and constructed wall, according to embodiments of the present invention represent an important paradigm shift over existing methods, which used the primary weather barrier or a combination of the primary and secondary weather barriers to prevent water entry into the wall cavity. In the above-described embodiments, the stand taken against water ingress is unequivocally positioned at the secondary weather barrier, thereby permitting a greater freedom of implantation at the primary weather barrier. Moreover, the water seal is not dependent on elements that show wear over time, such as caulking or tape, but rather depend on solid elements that have wear lives on the order of several decades. Given the over one-hundred million houses in the United States, an apparatus and method saving them from the damage caused by water ingress into the wall cavities, can be expected to save building owners many billions of dollars per year.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. An electrical unit mounting assembly, having a top, bottom, back and front, and comprising:
   a partial enclosure, made of insulating material, defining a cavity having a mouth at its front and defining at least one through hole leading to said cavity, at its back, said partial enclosure being in the shape formed by two arcs, on the sides, joined together at top and bottom by two line segments;
   a panel extending outwardly from said mouth, for at least 4 cm and having a front surface; and
   further includes two alignment posts extending rearwardly from said panel, and each aligned to the furthest sideways exterior extent of said partial enclosure.

2. The electrical unit mounting assembly of claim 1, further including a hinged closure for each through hole, each hinged closure urged to and in a position where it closes said through hole.

3. The electrical unit mounting assembly of claim 1, further including a hinged closure for each through hole, each hinged closure urged to a position where it closes said through hole, but at least one of said hinged closures pulled into an open position.

4. The electrical unit mounting assembly of claim 1, wherein said panel bears an indicator on its front surface indicating a preferred vertical orientation.

5. The electrical unit mounting assembly of claim 1, further including a telescoping extension fit into said partial enclosure.

6. The electrical unit mounting assembly of claim 5, wherein said partial enclosure includes an inner frame and a set of outer walls, and said telescoping extension is fitted into said cavity, between said inner frame and said outer wall.

7. The electrical unit mounting assembly of claim 6, further including a single adjustment bolt, having a longitudinal segment that is rotatably engaged to a first one of said base portion and said extension, and having a threaded portion being in threaded engagement to a second one of said base portion and said extension, so that rotation of said adjustment bolt causes said extension to move in a telescoping manner relative to said cavity.

8. The electrical unit mounting assembly of claim 1, wherein said panel further defines a set of raised areas on said panel's front surface, thereby forming a set of down channels for the flow of water.

9. The electrical unit mounting assembly of claim 1, wherein, when said assembly is oriented in an upright manner so that its top is topmost, said through hole is constructed so that liquid cannot be driven by gravity from inside said cavity, through said through hole.

10. An electrical receptacle mounting apparatus, having:
a base portion, made of insulating material, including:
a partial enclosure, defining a cavity having a mouth and at least one through hole, opposed to said mouth and being positioned and shaped to prevent water flowing through said at least one through-hole out of said cavity; and
a panel, extending outwardly for more than 4 cm, about said mouth;
a telescoping tubular extension, made of insulating material, fitted into said cavity, so that said cavity and extension together are sized to fit one, two or three electrical outlet receptacles;
a bolt, having a longitudinal segment that is rotatably engaged to a first one of said base portion and said extension, and having a threaded portion being in threaded engagement to a second one of said base portion and said extension, so that rotation of said threaded portion causes said extension to move in a telescoping manner relative to said cavity; and
wherein said bolt has a head and extends to a tip that is rotatably attached to said base portion, and said threaded portion is between said head and said tip, said threaded portion being in threaded engagement to a threaded through hole defined in said extension.

11. The electrical receptacle mounting apparatus of claim 10, further including a hinged closure for each through hole, each hinged closure urged to and in a position where it closes said through hole.

12. The electrical receptacle mounting apparatus of claim 11, wherein said partial enclosure is in the shape formed by two arcs, on the sides, joined together at top and bottom by two line segments.

13. The electrical receptacle mounting apparatus of claim 12, further including two alignment posts extending rearwardly from said panel, and each aligned to the furthest sideways exterior extent of said partial enclosure.

14. The electrical receptacle mounting apparatus of claim 10, further including a hinged closure for each through hole, each hinged closure urged to a position where it closes said through hole, but at least one of said hinged closures pulled into an open position.

15. The electrical receptacle mounting apparatus of claim 10, wherein said panel bears an indicator on its front surface indicating a preferred vertical orientation.

16. The electrical receptacle mounting apparatus of claim 10, wherein said partial enclosure includes an inner frame and a set of outer walls, and said telescoping extension is fitted into said cavity, between said inner frame and said outer wall.

17. The electrical receptacle mounting apparatus of claim 10, further wherein said bolt is the only adjustment bolt, and said adjustment can be made by turning said single bolt, only.

18. An electrical receptacle mounting apparatus, having:
a base portion, made of insulating material, including:
a partial enclosure, defining a cavity having a mouth and at least one through hole, opposed to said mouth and being positioned and shaped to prevent water flowing through said through hole out of said cavity; and
a panel, extending outwardly for more than 4 cm, about said mouth;
a telescoping tubular extension, made of insulating material, fitted into said cavity, so that cavity and extension together are sized to fit a one, two or three electrical outlet receptacles;
a bolt, having a longitudinal segment that is rotatably engaged to a first one of said base portion and said extension, and having a threaded portion being in threaded engagement to a second one of said base portion and said extension, so that rotation of said threaded portion causes said extension to move in a telescoping manner relative to said cavity; and
said bolt has a head and extends to a tip, and said threaded portion is in threaded engagement to a threaded hole defined in said extension portion, and including a nonthreaded portion, between said head and said threaded portion, that is rotatably engaged to a through hole in said base.

19. An electrical receptacle mounting apparatus, having:
a base portion, made of insulating material, including:
a partial enclosure, defining a cavity having a mouth and a single set of through-holes, opposed to said mouth and being positioned and shaped to prevent water flowing through any one of said through-holes out of said cavity; and
a panel, extending outwardly for more than 4 cm, about said mouth;
a telescoping tubular extension, made of insulating material, fitted into said cavity, so that cavity and extension together are sized to fit a one, two or three electrical outlet receptacles; and
a bolt, having a longitudinal segment that is rotatably engaged to a first one of said base portion and said extension, and having a threaded portion being in threaded engagement to a second one of said base portion and said extension, so that rotation of said threaded portion causes said extension to move in a telescoping manner relative to said cavity.

* * * * *